United States Patent
Jalkanen et al.

(10) Patent No.: US 12,108,357 B2
(45) Date of Patent: Oct. 1, 2024

(54) PROVISIONING OF A TERMINAL DEVICE FOR A MOBILE COMMUNICATION NETWORK

(71) Applicant: Telia Company AB, Solna (SE)

(72) Inventors: Tero Jalkanen, Tuusula (FI); Tomi Sarajisto, Helsinki (FI)

(73) Assignee: TELIA COMPANY AB, Solna (SE)

( * ) Notice: Subject to any disclaimer, the term of this patent is extended or adjusted under 35 U.S.C. 154(b) by 602 days.

(21) Appl. No.: 17/470,607

(22) Filed: Sep. 9, 2021

(65) Prior Publication Data
US 2022/0078741 A1  Mar. 10, 2022

(30) Foreign Application Priority Data

Sep. 10, 2020 (FI) .................................. 20205874

(51) Int. Cl.
*H04W 60/00* (2009.01)
*H04W 8/18* (2009.01)
*H04W 76/10* (2018.01)

(52) U.S. Cl.
CPC ............ *H04W 60/00* (2013.01); *H04W 8/18* (2013.01); *H04W 76/10* (2018.02)

(58) Field of Classification Search
CPC . H04W 72/23; H04W 72/0446; H04W 24/10; H04W 24/02; H04W 72/21;
(Continued)

(56) References Cited

U.S. PATENT DOCUMENTS

| 8,781,442 B1* | 7/2014 | Link, II | .................... H04L 9/30 370/338 |
|---|---|---|---|
| 2008/0076420 A1* | 3/2008 | Khetawat | ................ H04W 8/04 455/435.1 |

(Continued)

FOREIGN PATENT DOCUMENTS

| CN | 107396339 A | 11/2017 |
|---|---|---|
| EP | 2 499 853 A1 | 9/2012 |

(Continued)

OTHER PUBLICATIONS

European Search Report issued in European Patent Application No. 21 19 5496 dated Jan. 20, 2022.
(Continued)

*Primary Examiner* — Ajibola A Akinyemi
(74) *Attorney, Agent, or Firm* — NIXON & VANDERHYE

(57) ABSTRACT

Disclosed is a method for provisioning a terminal device to a mobile communication network. The method includes: requesting an attachment to the mobile communication network; receiving a response indicating an allowance of a limited access mode; requesting, by applying the limited access mode, a provisioning of the terminal device from a remote network node; provisioning the terminal device based on a received data over the control plane for accessing the mobile communication network in an enhanced access mode; and in response to a configuration re-requesting the attachment to the mobile communication network. Also disclosed is a terminal device, to a method performed by a network node, to the network node, and computer programs, and to a communication system.

23 Claims, 3 Drawing Sheets

(58) Field of Classification Search
CPC ........... H04W 84/042; H04W 72/1268; H04W 74/0833; H04W 60/00; H04W 76/27; H04W 48/18; H04W 74/0808; H04W 88/08; H04W 60/04; H04W 84/045
USPC ........................................................ 455/335
See application file for complete search history.

(56) References Cited

U.S. PATENT DOCUMENTS

| | | | | |
|---|---|---|---|---|
| 2008/0076425 | A1* | 3/2008 | Khetawat | H04W 12/069 |
| | | | | 455/436 |
| 2018/0324671 | A1 | 11/2018 | Palnati et al. | |
| 2019/0028337 | A1 | 1/2019 | Ryu et al. | |
| 2019/0364531 | A1 | 11/2019 | Zhang et al. | |
| 2021/0006614 | A1* | 1/2021 | Oyman | H04L 65/756 |

FOREIGN PATENT DOCUMENTS

| | | |
|---|---|---|
| EP | 3 132 624 A1 | 2/2017 |
| WO | 2011/057668 A1 | 5/2011 |
| WO | 2015/159072 A1 | 10/2015 |
| WO | 2019/136044 | 7/2019 |

OTHER PUBLICATIONS

Communication pursuant to Article 94(3) EPC issued in European Patent Application No. 21 195 496.1 dated Mar. 22, 2023.
Search Report for FI Application No. 20205874 dated Apr. 9, 2021, 2 pages.

* cited by examiner

PROVISIONING OF A TERMINAL DEVICE FOR A MOBILE COMMUNICATION NETWORK

This application claims priority to FI Patent Application No. 20205874 filed Sep. 10, 2020, the entire contents of which are hereby incorporated by reference.

BACKGROUND OF THE INVENTION

Field of the Invention

The invention concerns in general the technical field of telecommunications. More particularly, the invention concerns device management.

Description of the Related Art

Enabling a communication of a terminal device in a mobile communication network requires a provisioning of the terminal device. The provisioning refers to a procedure in which the terminal device is configured, i.e. prepared, so as to enable the communication with the communication network, and any entities therein or accessible through the mobile communication network.

Provisioning procedure for terminal devices according to prior art is typically performed with so-called over-the-air (OTA) process in which the mobile communication network transmits upon some signaling from the terminal device configuration data to the terminal device by using commonly available short message service, SMS. In response to a receipt of such a short message the terminal device is provisioned in accordance with instructions defined by the configuration data and many times it also requires manual work from the user of the terminal device. Moreover, an appropriate network connectivity to a network node arranged to interact with the terminal device in the context of the provisioning is required with a subscriber identity module residing in the terminal device in question. Still further, in a situation in which the terminal device is to be provisioned in a mobile communication network as a roaming device there may occur maloperation because the subscriber information is missing.

Hence, there is need to develop novel approaches for provisioning a terminal device to mitigate at least in part some of the above described drawbacks.

SUMMARY OF THE INVENTION

The following presents a simplified summary in order to provide basic under-standing of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present methods, apparatuses like a terminal device and a network node, computer programs, and a communication system for provisioning a terminal device.

The objects of the invention are reached by methods, apparatuses like a terminal device and a network node, computer programs, non-transitory computer-readable medium, and a communication system for provisioning a terminal device as disclosed and claimed.

According to a first aspect, a method for provisioning a terminal device to a mobile communication network is provided, the terminal device is equipped with a subscriber identity module, the method, performed by the terminal device, comprises: requesting an attachment to the mobile communication network; receiving a response from the mobile communication network, the response indicating an allowance of a limited access mode for the terminal device to the mobile communication network; requesting, by applying the limited access mode in a communication over the mobile communication network, a provisioning of the terminal device from a remote network node accessible based on the subscriber identity module residing in the terminal device; receiving data over a control plane from the remote network node; provisioning the terminal device based on the received data over the control plane, a provisioning defining at least one parameter for accessing the mobile communication network in an enhanced access mode; and in response to a configuration re-requesting the attachment to the mobile communication network by applying the at least one parameter to access the mobile communication network with the enhanced access mode.

The attachment may be requested at least by providing a device identifier to the mobile communication network in an attachment request. The device identifier may e.g. be an International Mobile Equipment Identity, IMEI.

An application of the limited access mode may be arranged by performing a communication on a control plane. For example, the communication on the control plane may be performed with Non-IP Data Delivery functionality implemented by a Service Capability Exposure Function, SCEF, in the mobile communication network.

Further, the data over the control plane from the remote network node may be received with short message service, SMS.

The at least one parameter for accessing the mobile communication network in an enhanced access mode defined in the provisioning may be an International Mobile Subscriber Identity, IMSI, received in the data from the remote network node.

Still further, the method may also comprise: initiating, in response to a receipt of an indication to allow the communication with the enhanced access mode, a communication over a user plane towards the mobile communication network.

According to a second aspect, a terminal device equipped with a subscriber identity module is provided, the terminal device is configured to perform: request an attachment to the mobile communication network; receive a response from the mobile communication network, the response indicating an allowance of a limited access mode for the terminal device to the mobile communication network; request, by applying the limited access mode in a communication over the mobile communication network, a provisioning of the terminal device from a remote network node accessible based on the subscriber identity module residing in the terminal device; receive data over a control plane from the remote network node; provision the terminal device based on the received data over the control plane, a provisioning defining at least one parameter for accessing the mobile communication network in an enhanced access mode; and in response to a configuration re-request the attachment to the mobile communication network by applying the at least one parameter to access the mobile communication network with the enhanced access mode.

The terminal device may be configured to request the attachment at least by providing a device identifier to the mobile communication network in an attachment request. For example, the device identifier may be an International Mobile Equipment Identity, IMEI.

The terminal device may be configured to apply the limited access mode by performing a communication on a control plane. For example, the terminal device may be configured to perform the communication on the control plane with Non-IP Data Delivery functionality implemented by a Service Capability Exposure Function, SCEF, in the mobile communication network.

Further, the terminal device may be configured to receive the data over the control plane from the remote network node with short message service, SMS.

Also, the terminal device may be configured to define, as at least one parameter for accessing the mobile communication network in an enhanced access mode, an International Mobile Subscriber Identity, IMSI, in the provisioning, the IMSI is received in the data from the remote network node.

The terminal device may also be configured to initiate, in response to a receipt of an indication to allow the communication with the enhanced access mode, a communication over a user plane towards the mobile communication network.

According to a third aspect, a computer program comprising computer readable program code configured to cause performing of the method according to the second aspect as described above when said program code is run on one or more computing apparatuses.

According to a fourth aspect, a method for controlling an access to a mobile communication network is provided, the method, performed by a network node, comprises: receiving a request of an attachment of a terminal device to a mobile communication network, the attachment is controlled at least in part by the network node; generating a response to the terminal device, the response indicating an allowance of a limited access mode for the terminal device to the mobile communication network; receiving a re-request of the attachment of the terminal device to the mobile communication network, wherein the re-request comprises data required in the attachment in order to allow an access to the mobile communication network with an enhanced access mode.

A generation of response indicating the allowance of the limited access mode to the mobile communication network may be performed in response to a detection that the request of the attachment fails to comprise data identifying a subscription of the terminal device.

According to a fifth aspect, a network node is provided, the network node is configured to perform: receive a request of an attachment of a terminal device to a mobile communication network, the attachment is controlled at least in part by the network node; generate a response to the terminal device, the response indicating an allowance of a limited access mode for the terminal device to the mobile communication network; receive a re-request of the attachment of the terminal device to the mobile communication network, wherein the re-request comprises data required in the attachment in order to allow an access to the mobile communication network with an enhanced access mode.

The network node may be configured to generate the response indicating the allowance of the limited access mode to the mobile communication network in response to a detection that the request of the attachment fails to comprise data identifying a subscription of the terminal device.

According to a sixth aspect, a computer program is provided, the computer program comprising computer readable program code configured to cause performing of the method according to the fourth aspect as defined above when said program code is run on one or more computing apparatuses.

According to a seventh aspect, a communication system is provided, the communication system comprising: a network node according to the fifth aspect as defined above, a remote network node; and at least one terminal device according to a second aspect as defined above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE DRAWINGS

The embodiments of the invention are illustrated by way of example, and not by way of limitation, in the figures of the accompanying drawings.

DESCRIPTION OF THE PREFERRED EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
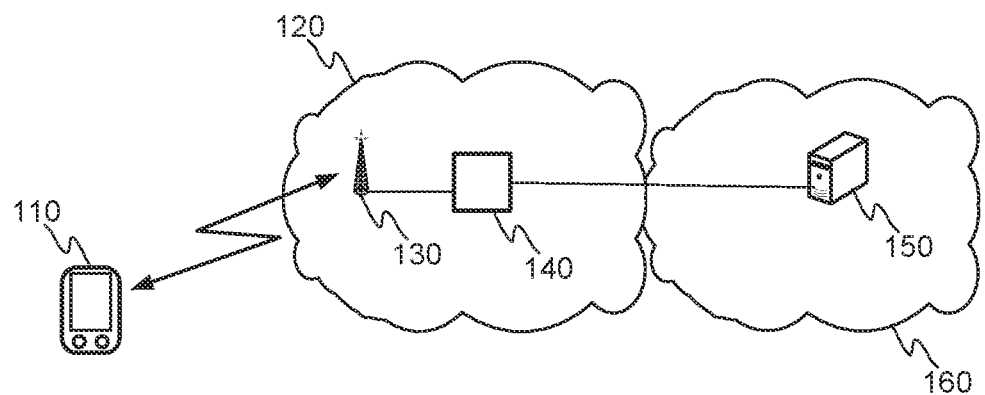
FIG. 1 illustrates schematically a communication system according to an example.

FIG. 1 illustrates by way of an example a communication system suitable for implementing the present invention. The communication system enables a provisioning of a terminal device 110 to use communication services of a mobile communication network 120 in a manner as will be described in the forthcoming description. For a purpose of described aspect according to an example it may be assumed that the terminal device 110 is pre-configured so that it may be turn on, but it does not comprise all configuration parameters for utilizing services of the mobile communication network 120 at a desired level. For example, the terminal device 110 may be a new device brought into a service area of the mobile communication network 120. The terminal device 110 may be equipped with a module, called as a subscriber identity module from now on, allowing the terminal device 110 to utilize communication services of mobile communications network at least in response to an execution of a method according to the invention as is herein described with examples. The subscriber identity module may be implemented as a physical module, such as a physical smart card (e.g. a universal integrated circuit card (UICC)), or with software implementation as a pro-grammable subscriber identity module (e.g. an embedded-SIM (eSIM) or embedded universal integrated circuit card (eUICC)). The term software implemented subscriber identity module may also cover so-called IP Multimedia Services Identity Module (ISIM), which is an application residing on the UICC and run by the terminal device 110. The terminal device 110 may be any device equipped with necessary hardware and software means and functionalities which enable wireless communication as well as interaction with the subscriber identity module. In some example embodiments the subscriber identity module may belong to the terminal device 110 as an integrated unit e.g. implemented with the software implementation. Some non-limiting examples of the terminal device 110 may be a mobile phone, a tablet computer, an IoT (Internet of Things) device, and so on.

As mentioned, the starting point for the solution in accordance with the present invention is that the terminal device 110 does not have necessary details of the mobile communication network 120 to start using services of the mobile communication network 110 at a desired level. For example, the terminal device 110 may not have information of an identifier called PLMN ID identifying a mobile operator to be used for communication. Alternatively or in addition, it may not be aware of so-called access point name (APN) identifying a gateway to be used between a mobile communication network 120 and another communication network, such as data network like Internet, which shall be applied to by the terminal device 110 when operating in the communication network. For sake of under-standing the present invention through the examples given herein the terminal device 110 may be understood as a device which is pre-configured so that when it is turned on, it starts establishing a communication connection to a communication network, e.g. providing basic communication services e.g. with LTE technology, and the terminal device requests access to one access point dedicated to provide services for provisioning of the terminal devices 110 as is described herein. Moreover, since the terminal device 110 may be prepared so that not even subscriber identity module comprises all necessary information, such as IMSI (International Mobile Subscriber Identity), e.g. because the devices 110 may be manufactured for enabling an integration of any mobile communication network 110, like IoT devices, and, hence, some crucial pieces of information for communication shall be configured to in order to access the mobile communication network providing services in the area of the terminal device, and wherein the terminal device may receive further details for communication e.g. from the communication network, if not stored in a memory of the terminal device. Generally speaking, some non-limiting examples of information possibly necessary for operating in a certain communication network may e.g. by APN as mentioned, SMSC address, Server address/URL for multiple purposes (such as Supplementary Services (e.g. XCAP) or location based services), IMS set-tings (e.g. when NG.108 VOLTE for LTE-M is used), QoS settings, Allowed/blocked network services, and/or Used IP version.

Figure 2:
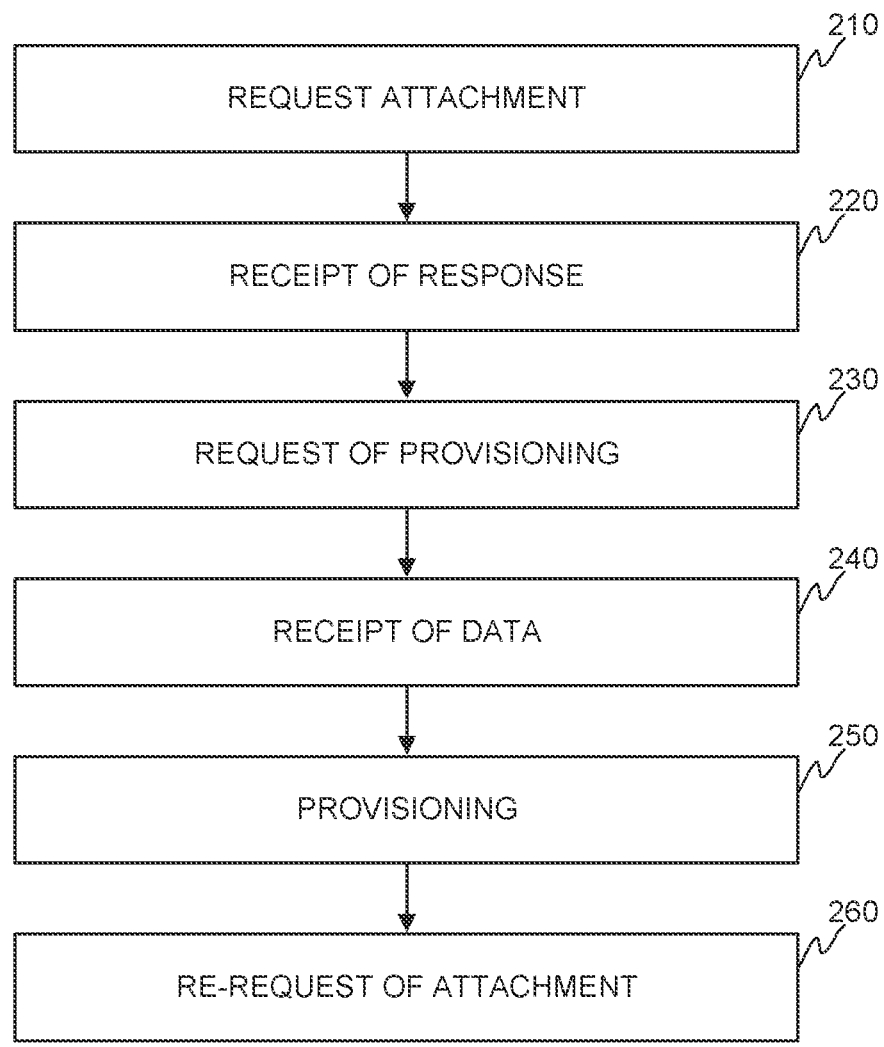
FIG. 2 illustrates schematically a method according to an example.

The provisioning of the terminal device 110 is now described by referring to FIG. 2 together with FIG. 1. FIG. 2 illustrates schematically a method performed by the terminal device 110 to enable the provisioning of the terminal device 110 to use services of the mobile communication network 120. The method may e.g. be initiated in response to a activating the terminal device 110 to access to a communication network, such as to use communication services provided by the mobile communication network 120. Depending of settings of the terminal device 110 the activation may refer to an arrangement in which in response to switching on the terminal device 110 the terminal device 110 is automatically configured to access to a mobile communication network 120, or al-ternatively it may be achieved in response to predetermined actions, such as manual operations by the user of the terminal device 110. In any case, the initiation of the access to the communication network may cause a generation of an attach request 210 to the mobile communication network 120 suitable to provide communication services within the area the terminal device 110 resides. In accordance with an example a selection of one or more communication networks to which the terminal device 110 tries to attach may be performed according to a logic defined in the terminal device 110 during the manufacturing process. For example, a memory may store a logic defining an order of mobile communication networks 120 into which the terminal device 110 tries to attach to. The order may e.g. be defined in accordance of technological features the network is able to provide to serve the terminal device 110 in a preferred manner. The order of the network technologies may e.g. be the following: 1) LTE-M, 2) NB-IOT, 3) 4G, 4) 3G, 5) 2G. Since one or more mobile communication networks 120 may implement e.g. the listed technologies in the area the terminal device 110 resides and, hence, transmit signals therein, the terminal device 110 may perform the selection of the mobile communication network 120 for the attach request by identifying respective networks from the received signals in accordance with the defined logic. The attachment procedure itself, and hence the attach request, may be performed, by the terminal device 110, in accordance to a standard procedure defined for the network technology implemented by the selected mobile communication network 110. Moreover, the terminal device 110 may be arranged to, in response to a detection, that it does not comprise necessary definitions for connecting to the mobile communication network 120, to apply socalled minimum configuration settings enabling a limited connectivity to the mobile communication technology, which may e.g. refer to using a Non-IP Data Delivery (NIDD) for communication.

The attach request is received by a network node 140 implementing network management function at least in part as regards to accessing the mobile communication network 120. The attach request is received through a radio access network comprising e.g. a number of base stations 130, such as eNode B. The network node 140 performing the network management operations may e.g. be a Mobility Management Entity (MME), or any other like C-SGN in NB-IOT/LTE-M, or AMF for a mobile communication network implementing 5G. Since the terminal device 110, and the subscriber identity module residing in the terminal device 110, fails to, i.e. does not, comprise all necessary configuration information, such as an identifier like IMSI identifying the subscription the attach re-quest carries only an International Mobile Equipment Identity, IMEI, as the identifier for the attach request. Naturally, the attach request may carry other parameters, but they are not relevant for the purpose of describing the present invention, and, hence, they are not discussed herein.

In response to a detection, by the network node 140, that the attach request comprises only the IMEI as an identifier of the terminal device 110, the network node 140 may be configured to generate a response to the terminal device 110 indicating an allowance of a limited access mode in accessing the mobile communication network 120. The network node 140 may also be configured to gen-eral control signal to respective entities, such as one or more registers storing subscriber related information for communicating in the communication network, for informing on the limited access mode of the terminal device 110, or the subscription in question, in the mobile communication network 120. For example, in response to a receipt of the control signal, the register may be caused to store an indicator in the data representing that the terminal device 110 is an unauthenticated device in the mobile communication network 120. The limited access mode may refer to a service level in which the terminal device 110 is allowed to use of a control plane traffic in the mobile communication network 120. For example, it may be defined that the control plane traffic may be performed with a Non-IP Data Delivery functionality (NIDD) e.g. implemented by a Service Capability Exposure Function, SCEF, in the mobile communication network 120. In some examples, the network node 140 receiving the attach request comprising the IMEI may be arranged to generate a temporal IMSI to be delivered to the terminal device 110 for enabling at least some operation of the terminal device 110 in the mobile communication network 120 as is described in the forthcoming description. The temporal IMSI may e.g. be valid over a predefined period of time. The generation of the temporary IMSI comprises e.g. a creation of the temporal IMSI and a transmission of it to the terminal device 110. Alternatively or in addition, it may also cover a solution that a ready-made IMSI is obtained from a memory accessible to the network node 140 and a transmission of it to the terminal device 110.

As a subsequent step to a receipt of the response 220 indicating the limited access mode the terminal device 110 may generate a request 230, by applying the limited access mode in the communication over the mobile communication network 120, of a provisioning of the terminal device 110. The request may be generated to another network node 150, called as a remote network node from now on, accessible based on the subscriber identity module residing in the terminal device, wherein the remote network node may e.g. reside in another communication network 160, such as in a home mobile communication network, defined e.g. in the subscriber identity module residing, or defined, in the terminal device 110. The request may be delivered to the remote network node 150 based on information stored in a memory of the terminal device 110. This may refer to an implementation in which a network address of the remote network node 150, or any access point leading to the remote network node 150, is defined in the memory for the provisioning purposes. Further, the respective mobile communication network 120, and at least one network element therein, such as SCEF/PGW, may be configured to operate so that the data traffic in the described situation is directed to the remote network node 150 configured to implement the provisioning at least in part. In response to a receipt of the request by the first mobile communication network 120, the respective entity, such as the network node 140 may derive a destination address of the request from the signal delivered on the control plane traffic, and direct the request to the destination address, which herein corresponds to the remote network node 150 residing in the other communication network 160, such as in data network like Internet. The request generated by the terminal device 110 may be generated by the terminal device 110 so that it carries data indicating that the terminal device 110 requests provisioning so that provisioning related data shall be delivered over a control plane to the terminal device 110. Such a request may be predefined in a memory of the terminal device 110, or it may be generated automatically e.g. in response to a receipt of the response from the network node 140 indicating an allowance of the use the limited access mode in the mobile communication network 120.

The remote network node 150 may be arranged, in response to a receipt of the provisioning request (cf. step 230), to generate a response to the terminal device 110 over a control plane. The response delivered on a control plane may refer to an arrangement in which the remote network node 150 is arranged to deliver the response over the air message so that it delivers the response comprising the provisioning data to the terminal device 110 back to the mobile communication network 120 in which the provisioning data is delivered to the terminal device 110 on the control plane as an over-the-air message, like as a short message, SMS, with SS7 signaling. In order to reach the terminal device 110 in the situation in which the terminal device 110 does not have all necessary information for permanent operation in the mobile communication network, it may be arranged that the IMEI received by the mobile communication network 120, and the network node 140, is used for generating another address for the terminal device 110, such as so-called SIP-URI (a Uniform Resource Identifier (URI) scheme for the Session Initiation Protocol (SIP)) which enables routing of data traffic to the corresponding entity represented by the SIP-URI. Hence, the SIP-URI may be generated in response to a receipt of the attach request 325 providing the IMEI to the network, which is then maintained for the on-going session e.g. by the network node 140. Alternatively, if the temporary IMSI, as mentioned in the foregoing description, is generated, it may be applied for the communication to reach the terminal device 110 to deliver the provisioning data to the terminal device 110.

In response to a receipt of the provisioning data 240 the terminal device 110 may be configured to detect that the received signaling comprises the provisioning data and initiate a provisioning 250 of the terminal device 110. For example, the terminal device 110 may set itself to a configuration mode in which it performs a predefined provisioning functionality which may takes as an input the provisioning data received 240. Alternatively or in addition, the provisioning data may comprise a computer program code which may be run by the terminal device 110 during the provisioning. The provisioning 250 may comprise that the remote network node 150 has included at least an IMSI allocated to the subscriber identity module residing in the terminal device 110 and subsequently to the provisioning the terminal device 110 comprises a full identifier to the mobile communication network 120. In addition to the IMSI the provisioning data may comprise other data, such as a network operator specific data like supported network technologies and details related thereto, like timer values, maximum bandwidth, available APNs, SMSC address and so on.

Now, in response to the provisioning the terminal device 110 may be arranged to request a re-attachment 260 to the mobile communication network 120. The request may be performed in the same manner as described in the context of the step 210, but now the terminal device 110 may include further information for the attachment, such as the IMSI representing the subscription in the mobile communication network 120 or access point name (APN), or any similar information, which may allow the terminal device 110 to access the mobile communication network 120 in a so-called enhanced access mode. The enhanced access mode may refer to an access mode comprising more capabilities than the limited access mode allowed to the terminal device 110 in response to the first attach request. In accordance with some examples, the enhanced access mode may be defined so that it allows the terminal device 110 to perform communication also on other planes than the control plane. For example, the terminal device 110 may be allowed to perform communication on a user plane i.e. a trans-fer of data on the user plane may be allowed.

In response to the re-attachment the mobile communication network 120, and the network node 140, may generate a response to the terminal device indicating that the re-attachment has successfully occurred. In some non-limiting examples, in response to the successful re-attachment the terminal device 110 may be arranged to finalize the provisioning with the remote network node 150, or with any other entity, in which e.g. such an amount of data is transferred that it cannot be, or is not meaningful, to deliver in step 240.

Figure 3:
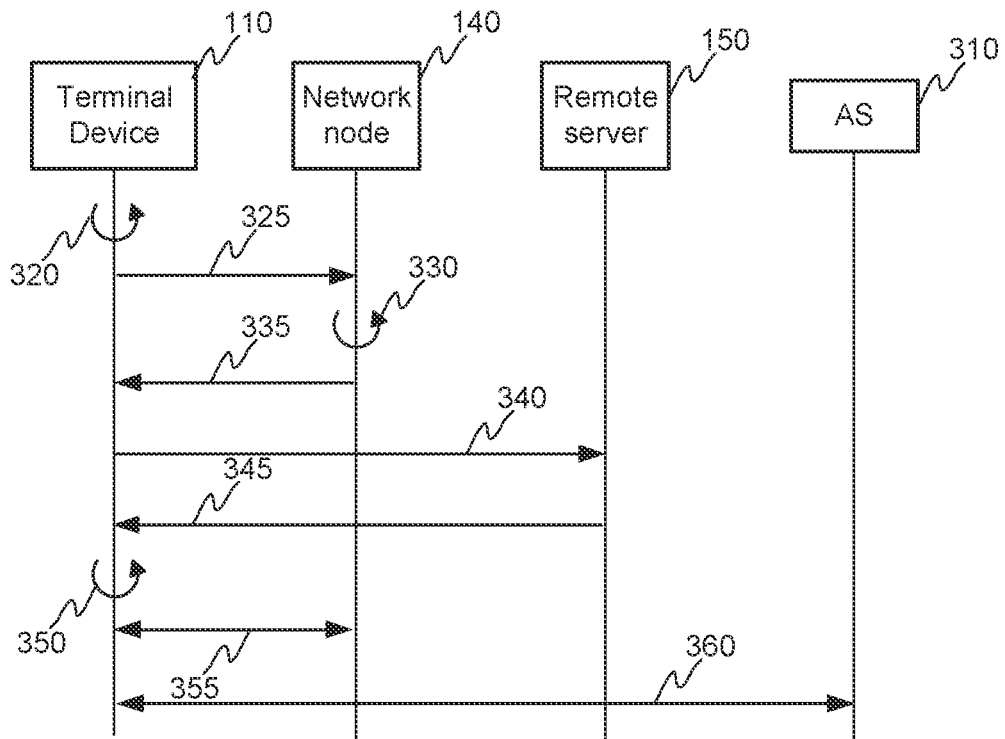
FIG. 3 illustrates schematically a method as a flow chart according to an example.

FIG. 3 illustrates schematically some aspects of a method according to an example as a flow chart. The flow chart is illustrated so that the terminal device 110 aims to establish a communication connection to an application server 310. For example, the terminal device 110 may be an IoT device, such as a measurement device, which may communicate with the application server 310 e.g. for delivering measurement results thereto. For example, the terminal device 110 may be installed in a predefined location and turned on. In response to the turn-on, the terminal device 110 may e.g. automatically initiate a search of a communication network e.g. by applying a logic defined in it, but since all necessary data is not defined in the terminal device 110 it cannot access to any communication network as a normal subscriber. The internal operation of the terminal device 110 in response to the turn-on is referred with 320 in FIG. 3. In response to the internal operation 320 the terminal device 110 may be configured to generate an attach request 325 to the mobile communication network 120, and to the network node 140, therein in the manner as described. In response to the receipt of the attach request 325 the network node 140 may initiate performing an attachment procedure 330, and in response to the detection that the attach request 325 does not comprise all necessary information, it may generate the response message 335 to the terminal device 110 indicating that a limited access mode may be allowed to the terminal device 110. In response to the receipt of the response message 335 the terminal device 110 may be configured to request a provisioning of the terminal device 110 with a provisioning request message 340 from a remote network node 150. The provisioning request message 340 is delivered by applying the limited access mode through the mobile communication network 120. The remote network node 150 may responds with a provisioning data message 345 to the terminal device 110 over the control plane, such as by using so-called short message service over SS7. In response to a receipt of the provisioning data comprising IMSI allocated to the terminal device 110 in question, the terminal device 110 may perform the provisioning to an extent enabled by the received provisioning data (referred with 350 in FIG. 3). Subsequently to the successful provisioning the terminal device 110 may be arranged to generate a re-attach request 355 for being allowed to use an enhanced access mode in the mobile communication network 120. Now, since the terminal device 110 is able to provide all the necessary information for accessing the mobile communication network in the enhanced access mode, an access right may be granted by the mobile communication network 120 (included in signal 355 in FIG. 3). Finally, the terminal device 110 may start communicating with the application server 310 by using the enhanced access mode, such as using user plane for data transmission between the entities.

Figure 4:
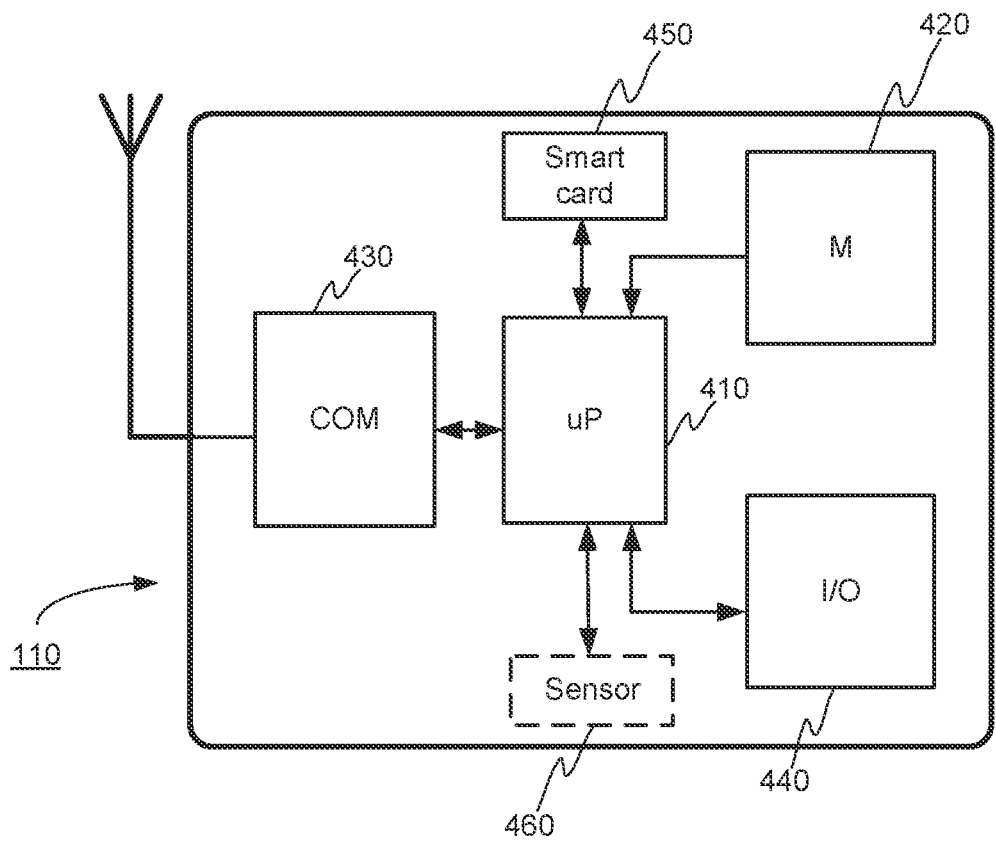
FIG. 4 illustrates schematically a terminal device according to an example.

FIG. 4 illustrates schematically, as a block diagram, a non-limiting example of a terminal device 110 suitable of implementing the method at least in part. The terminal device 110 may comprise at least one processor 410 arranged to control an operation of the terminal device 110 by executing one or more computer programs. The terminal device 110 may also comprise at least one memory 420, at least one communication interface 430 and one or more input/output devices 440 for inputting and outputting information. The memory 420 may be arranged to store computer program code, but also further data, such as parameter data and any other data e.g. obtained and generated by the terminal device 110. Such input/output devices may e.g. be keyboard, buttons, touch screen, display, loudspeaker, microphone camera and so on. In some implementation of the terminal device 110 at least some of the input/output devices may be external to the terminal device 110 and coupled to it either wirelessly or in a wired manner. Further, the terminal device 110 may comprise a smart card 450 which may be needed e.g. in accessing to a mobile communication network 120. For example, the smart card may operate as a subscriber identity module (SIM) for the mobile communication network. The smart card 450 may be replaced with, or comple-mented with, one or more computer programs which may be arranged to imple-ment a functionality of the subscriber identity module. Still further, the terminal device 110 may comprise one or more sensors for obtaining measurement data e.g. to be conveyed when the terminal device 110 is provisioned in full.

The communication interface 430 of the terminal device 110 refers to hardware and software implementation by means of which the terminal device 110 may be arranged, e.g. under control of the processor 410, to communicate with one or more communication technologies with other entities. Hence, the terminal device 110 is arranged to be capable of communicating at least with the network node 140 in the mobile communication network 120. For example, the terminal device 110 may be arranged to implement communication with the NIDD, but also with any other communication technology allowing e.g. the communication in the enhanced mode.

Figure 5:
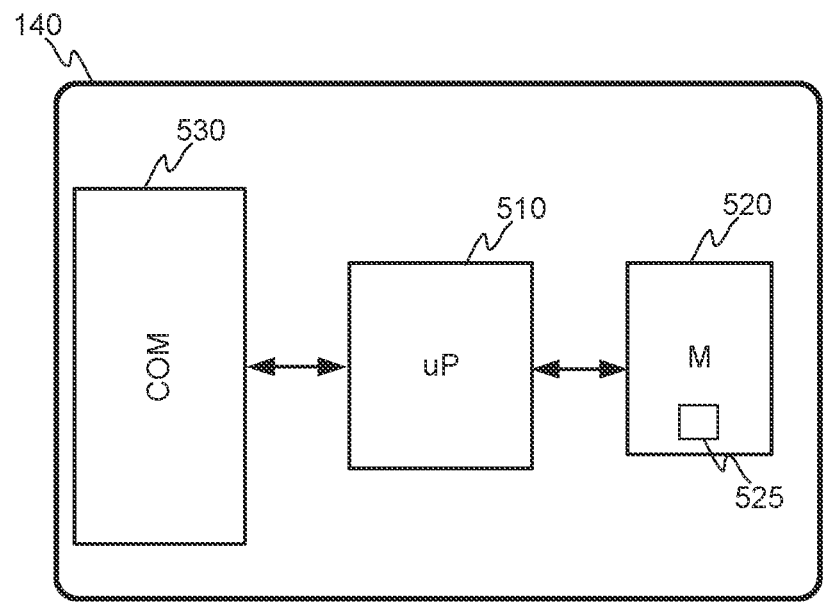
FIG. 5 illustrates schematically a network node according to an example.

FIG. 5 illustrates schematically, as a block diagram, a non-limiting example of a network node 140 configured to perform one or more control operations regarding an access to a mobile communication network 120 in a context the terminal device 110 is provisioned for operating in the communication network 120.

The network node 140 may comprise at least one processor 510 arranged to control an operation of the network node 140 by executing one or more computer programs. The network node 140 may also comprise at least one memory 520 and at least one communication interface 530. The memory 520 may be arranged to store computer program code 525, but also further data, such as parameter data and any other data e.g. obtained and generated by the network node 140. The communication interface 530 of the network node 140 may refer to hardware and software implementation by means of which the network node 140 may be arranged, e.g. under control of the processor 510, to communicate with one or more communication technologies with other entities, such as with the terminal device 110 through other network entities, such as base stations like eNodes, as well as with other entities in the communication network 120 and in other communication networks 160, either directly or indirectly. In the context of the present invention the network node 140 may be arranged to implement communication with the NIDD, but also with any other communication technology allowing e.g. the communication in the enhanced mode.

Figure 6:
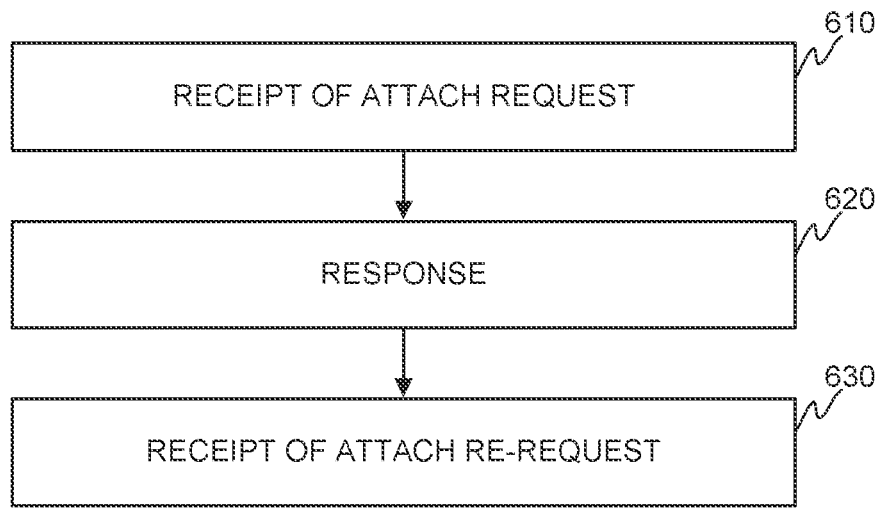
FIG. 6 illustrates schematically a method according to another example.

In accordance with an example, the network node 140 may be arranged to perform an operation enabling a provisioning of the terminal device 110 in the manner as described in the foregoing description. The operation comprises at least in part one or more control operations relating to an access of a terminal device 110 to a mobile communication network 120. A non-limiting example of a method the network node 140 is configured to perform is schematically illustrated in FIG. 6. As derivable from the foregoing description the network node 140 may receive 610 a request of an attachment of a terminal device 110 to a mobile communication network 120. The request is received by the network node 140 from the terminal device 110 over one or more network entities. As described the attachment may be controlled at least in part by the network node 140. Next, the network node 140 may generate 620 a response to the terminal device 110 wherein the response may comprise data indicating an allowance of a limited access mode for the terminal device 110 to the mobile communication network 120. The reason for such a response is that the network node 140 detected that the attach request 610 fails to comprise data which would have allowed to grant a full access to the mobile communication network 120. For example, the attach request 610 may not comprise all necessary information, such as an identifier representing the subscription, like IMSI, which causes the network node 140 to allow the limited access to the mobile communication network 120. After the described operations of the terminal device 110 with other entities, such as the remote network node 150, the network node 140 may receive 630 a re-request of the attachment of the terminal device 110 to the mobile communication network 120. The re-request may comprise data required in the attachment in order to allow an access to the mobile communication network 120 with an enhanced access mode. In other words, the terminal device 110 may have received all necessary information for generating an improved attach request i.e. such as one comprising an identifier of the subscription, like IMSI, allocated to the subscriber identity module residing in the terminal device 110.

For sake of clarity it is worthwhile to mention that some aspects of the invention relate to a communication system according to an example, which communication system may comprise at least one network node 140 as described, at least one remote network node 150 as described, and at least one terminal device 110 as described which are arranged to operate together in the described manner.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for provisioning a terminal device to a mobile communication network, the terminal device is equipped with a subscriber identity module, the method, performed by the terminal device, comprises:
   requesting an attachment to the mobile communication network,
   receiving a response from the mobile communication network, the response indicating an allowance of a limited access mode for the terminal device to the mobile communication network,
   requesting, by applying the limited access mode in a communication over the mobile communication network, a provisioning of the terminal device from a remote network node accessible based on the subscriber identity module residing in the terminal device,
   receiving data over a control plane from the remote network node, provisioning the terminal device based on the received data over the control plane, a provisioning defining at least one parameter for accessing the mobile communication network in an enhanced access mode, and
   in response to a configuration re-requesting the attachment to the mobile communication network by applying the at least one parameter to access the mobile communication network with the enhanced access mode.

2. The method of claim 1, wherein the attachment is requested at least by providing a device identifier to the mobile communication network in an attachment request.

3. The method of claim 2, wherein the device identifier is an International Mobile Equipment Identity, IMEI.

4. The method of claim 1, wherein an application of the limited access mode is arranged by performing a communication on a control plane.

5. The method of claim 4, wherein the communication on the control plane is performed with Non-IP Data Delivery functionality implemented by a Service Capability Exposure Function, SCEF, in the mobile communication network.

6. The method of claim 1, wherein the data over the control plane from the remote network node is received with short message service, SMS.

7. The method of claim 1, wherein the at least one parameter for accessing the mobile communication network in an enhanced access mode defined in the provisioning is an International Mobile Subscriber Identity, IMSI, received in the data from the remote network node.

8. The method of claim 1, the method further comprising:
   initiating, in response to a receipt of an indication to allow the communication with the enhanced access mode, a communication over a user plane towards the mobile communication network.

9. A terminal device equipped with a subscriber identity module, the terminal device is configured to perform:
   request an attachment to the mobile communication network,
   receive a response from the mobile communication network, the response indicating an allowance of a limited access mode for the terminal device to the mobile communication network,
   request, by applying the limited access mode in a communication over the mobile communication network, a provisioning of the terminal device from a remote network node accessible based on the subscriber identity module residing in the terminal device,
   receive data over a control plane from the remote network node,
   provision the terminal device based on the received data over the control plane, a provisioning defining at least one parameter for accessing the mobile communication network in an enhanced access mode, and in response to a configuration re-request the attachment to the mobile communication network by applying the at least one parameter to access the mobile communication network with the enhanced access mode.

10. The terminal device of claim 9, wherein the terminal device is configured to request the attachment at least by providing a device identifier to the mobile communication network in an attachment request.

11. The terminal device of claim 10, wherein the device identifier is an International Mobile Equipment Identity, IMEI.

12. The terminal device of claim 9, wherein the terminal device is configured to apply the limited access mode by performing a communication on a control plane.

13. The terminal device of claim 12, wherein the terminal device is configured to perform the communication on the control plane with Non-IP Data Delivery functionality implemented by a Service Capability Exposure Function, SCEF, in the mobile communication network.

14. The terminal device of claim 9, wherein the terminal device is configured to receive the data over the control plane from the remote network node with short message service, SMS.

15. The terminal device of claim 9, wherein the terminal device is configured to define, as at least one parameter for accessing the mobile communication network in an enhanced access mode, an International Mobile Subscriber Identity, IMSI, in the provisioning, the IMSI is received in the data from the remote network node.

16. The terminal device of claim 9, wherein the terminal device is configured to initiate, in response to a receipt of an indication to allow the communication with the enhanced access mode, a communication over a user plane towards the mobile communication network.

17. A non-transitory computer-readable medium on which is stored computer readable program code configured to perform a method when said program code is executed by one or more computing apparatuses, the method comprising:
requesting an attachment to the mobile communication network,
receiving a response from the mobile communication network, the response indicating an allowance of a limited access mode for the terminal device to the mobile communication network,
requesting, by applying the limited access mode in a communication over the mobile communication network, a provisioning of the terminal device from a remote network node accessible based on the subscriber identity module residing in the terminal device,
receiving data over a control plane from the remote network node, provisioning the terminal device based on the received data over the control plane, a provisioning defining at least one parameter for accessing the mobile communication network in an enhanced access mode, and
in response to a configuration re-requesting the attachment to the mobile communication network by applying the at least one parameter to access the mobile communication network with the enhanced access mode.

18. A method for controlling an access to a mobile communication network, the method, performed by a network node, comprises:

receiving a request of an attachment of a terminal device to a mobile communication network, the attachment is controlled at least in part by the network node,
generating a response to the terminal device, the response indicating an allowance of a limited access mode for the terminal device to the mobile communica-tion network,
receiving a re-request of the attachment of the terminal device to the mobile communication network, wherein the re-request comprises data required in the attachment in order to allow an access to the mobile communication network with an enhanced access mode.

19. The method of claim 18, wherein a generation of response indicating the allowance of the limited access mode to the mobile communication network is performed in response to a detection that the request of the attachment fails to comprise data identifying a subscription of the terminal device.

20. A network node configured to perform:
receive a request of an attachment of a terminal device to a mobile communication network, the attachment is controlled at least in part by the network node,
generate a response to the terminal device, the response indicating an allowance of a limited access mode for the terminal device to the mobile communica-tion network,
receive a re-request of the attachment of the terminal device to the mobile communication network, wherein the re-request comprises data required in the attachment in order to allow an access to the mobile communication network with an enhanced access mode.

21. The network node of claim 20, wherein the network node is configured to generate the response indicating the allowance of the limited access mode to the mobile communication network in response to a detection that the request of the attachment fails to comprise data identifying a subscription of the terminal device.

22. A non-transitory computer-readable medium on which is stored a computer program comprising computer readable program code configured to perform a method when said program code is executed by one or more computing apparatuses, the method comprising:
receiving a request of an attachment of a terminal device to a mobile communication network, the attachment is controlled at least in part by the network node,
generating a response to the terminal device, the response indicating an allowance of a limited access mode for the terminal device to the mobile communication network,
receiving a re-request of the attachment of the terminal device to the mobile communication network, wherein the re-request comprises data required in the attachment in order to allow an access to the mobile communication network with an enhanced access mode.

23. A communication system, comprising:
a network node configured to perform:
receive a request of an attachment of a terminal device to a mobile communication network, the attachment is controlled at least in part by the network node,
generate a response to the terminal device, the response indicating an allowance of a limited access mode for the terminal device to the mobile communication network,
receive a re-request of the attachment of the terminal device to the mobile communication network, wherein the re-request comprises data required in the attachment in order to allow an access to the mobile communication network with an enhanced access mode;

a remote network node, and at least one terminal device equipped with a subscriber identity module, the terminal device is configured to perform:

request an attachment to the mobile communication network, receive a response from the mobile communication network, the response indicating an allowance of a limited access mode for the terminal device to the mobile communication network, request, by applying the limited access mode in a communication over the mobile communication network, a provisioning of the terminal device from a remote network node accessible based on the subscriber identity module residing in the terminal device, receive data over a control plane from the remote network node, provision the terminal device based on the received data over the control plane, a provisioning defining at least one parameter for accessing the mobile communication network in an enhanced access mode, and in response to a configuration re-request the attachment to the mobile communication network by applying the at least one parameter to access the mobile communication network with the enhanced access mode.

* * * * *